United States Patent
Togashi et al.

(10) Patent No.: US 9,256,061 B2
(45) Date of Patent: Feb. 9, 2016

(54) FOCUS CONTROL APPARATUS AND METHOD

(71) Applicant: Samsung Electronics Co., Ltd., Suwon-si (KR)

(72) Inventors: Mitsuhiro Togashi, Yokohama (JP); Harutaka Sekiya, Yokohama (JP)

(73) Assignee: Samsung Electronics Co., Ltd. (KR)

( * ) Notice: Subject to any disclaimer, the term of this patent is extended or adjusted under 35 U.S.C. 154(b) by 158 days.

(21) Appl. No.: 14/099,549

(22) Filed: Dec. 6, 2013

(65) Prior Publication Data

US 2014/0160558 A1 Jun. 12, 2014

(30) Foreign Application Priority Data

Dec. 6, 2012 (JP) .................................. 2012-267407

(51) Int. Cl.
*G02B 21/26* (2006.01)
*G02B 21/24* (2006.01)
*G02B 21/00* (2006.01)

(52) U.S. Cl.
CPC .............. *G02B 21/26* (2013.01); *G02B 21/247* (2013.01); *G02B 21/0016* (2013.01)

(58) Field of Classification Search
CPC ... G02B 21/26; G02B 21/247; G02B 21/0016
USPC ..................................... 359/382, 383
See application file for complete search history.

(56) References Cited

U.S. PATENT DOCUMENTS

2009/0154318 A1 * 6/2009 Noehte et al. .............. 369/53.35

FOREIGN PATENT DOCUMENTS

JP 2002-090311 3/2002

* cited by examiner

*Primary Examiner* — Frank Font
(74) *Attorney, Agent, or Firm* — Myers Bigel Sibley & Sajovec, PA (57) ABSTRACT

A focus control apparatus and method capable of generating a focus position signal according to focus position error even in proximity to an interface between regions having different thicknesses, to perform a high precision focus position control using the focus position signal, are provided. A focus control apparatus includes an error signal correction portion configured to process a focus error signal that indicates an error of a focus position of an optical system with respect to an object. Moreover, the focus control apparatus includes a region conversion detection portion configured to output a region signal that corresponds to a first region or a second region of the object. The first and second regions of the object have different respective heights.

14 Claims, 12 Drawing Sheets

FOCUS CONTROL APPARATUS AND METHOD

CROSS-REFERENCE TO RELATED APPLICATION

This application claims priority under 35 U.S.C. §119 to Japanese Patent Application No. 2012-267407, filed on Dec. 6, 2012 in the Japan Patent Office, the contents of which are herein incorporated by reference in their entirety.

BACKGROUND

1. Field

Example embodiments relate to a focus control apparatus for controlling a focus in an optical system of a microscope.

2. Description of the Related Art

Figure 8:
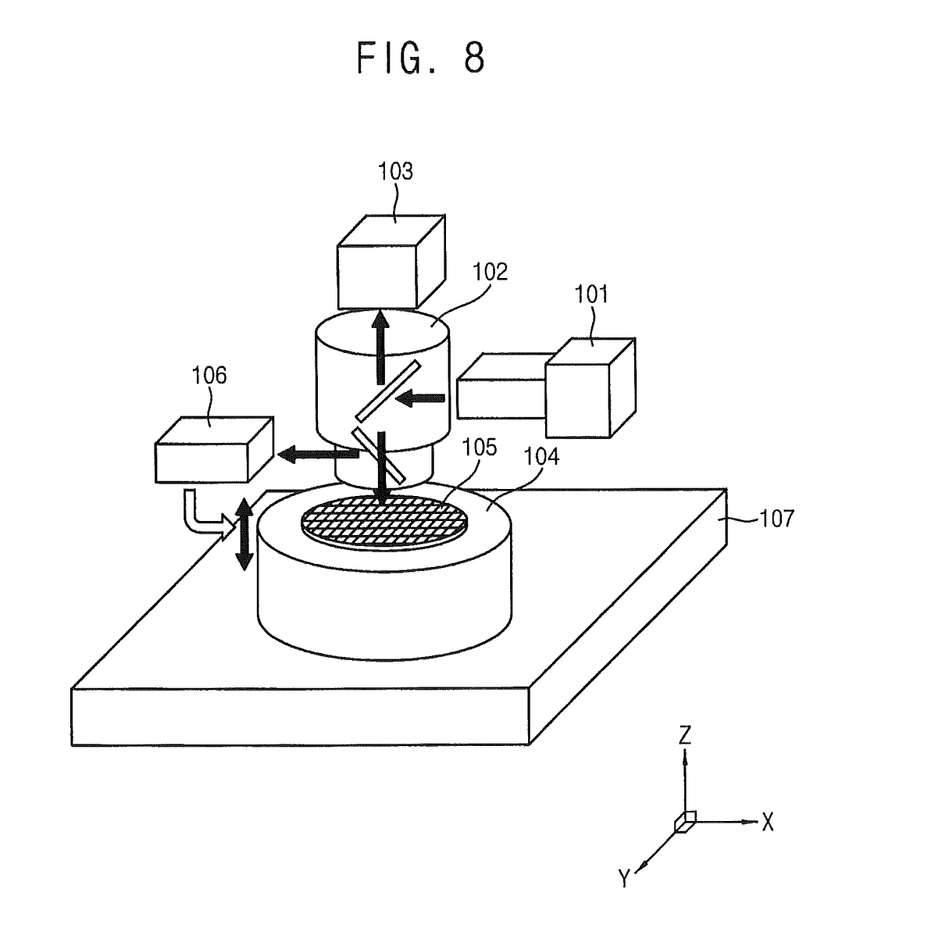
FIG. 8 is a view illustrating a general optical semiconductor inspecting apparatus.

In order to perform a surface inspection of a semiconductor device, an optical semiconductor inspecting apparatus includes a microscopic system having a high precision automatic focus control performance to optically form an image from a fine pattern (for example, see Patent document 1). FIG. 8 is a view illustrating a general optical semiconductor inspecting apparatus. A light illumination portion 101 emits a light toward an optical system 102 of a microscope. Then, the light from the light illumination portion 101 is incident onto the optical system 102. The optical system 102 irradiates an irradiation light, using a reflection plate and the like disposed therein, to a surface of a semiconductor wafer 105 that is disposed on an XYZ stage 104. An image capturing device 103 picks up the surface of the semiconductor wafer 105, by a reflection light from the irradiation light. In here, a focus position control portion 106 detects a focal point dislocation of the optical system 102 and move the XYZ stage 104 in a direction parallel with an optical axis, that is, Z direction, to control a focus position.

In this case, the focus position control portion 106 detects a deviation amount of the semiconductor wafer 105 from the focus position of the optical system 102 of the microscope using the reflection light from an object to be detected, that is, the surface of the semiconductor wafer 105.

The focus position control portion 106 feedbacks a focus error signal to a stage control mechanism 107 that performs a three dimensional adjustment for X axis, Y axis and Z axis of the XYZ stage 104. The focus error signal indicates the deviation amount from the focus position.

Thus, the stage control mechanism 107 performs a position control in Z axis of the XYZ stage 104, by the feedback focus error signal, to focus the optical system 102 of the microscope on the surface of the semiconductor wafer 105.

Figure 9:
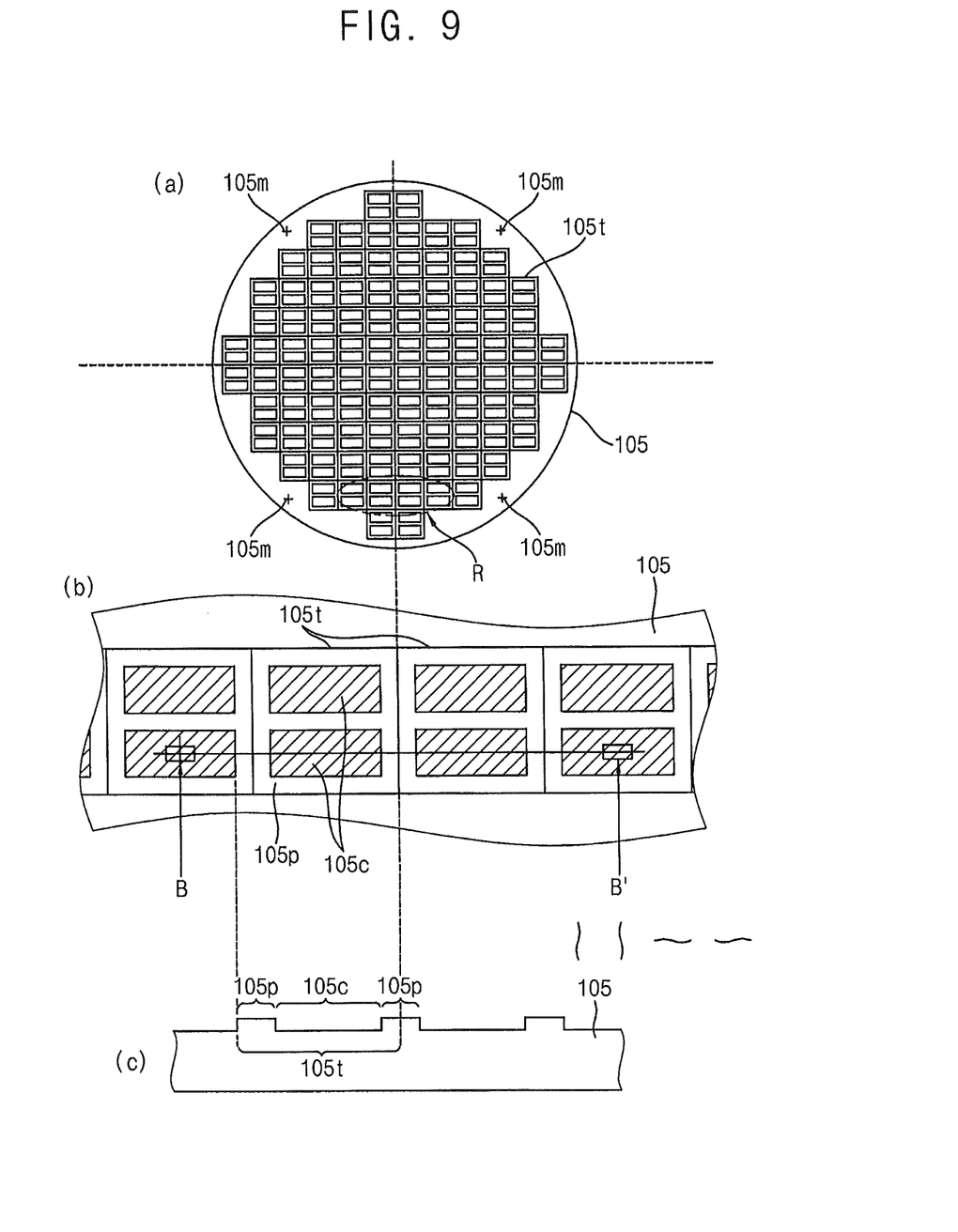
FIGS. 9(a) to 9(c) are views illustrating a surface shape of a semiconductor wafer 105 to be detected by the semiconductor inspecting apparatus.

FIGS. 9(a) to 9(c) are views illustrating a surface shape of the semiconductor wafer 105 to be detected by the semiconductor inspecting apparatus. FIG. 9(a) is a view illustrating a surface of the semiconductor wafer 105 where chips are formed. FIG. 9(b) is a view illustrating the region (R) of the semiconductor wafer 105. FIG. 9(c) is a cross-sectional view taken along the line B-B' in the region (R) in FIG. 9(b).

As illustrated in FIG. 9(a), the semiconductor wafer 105 has a plurality of the chips 105T that are periodically arranged therein. As illustrated in FIG. 9(b), in case that the chip 105T is, for example, a semiconductor memory device, the chip 105T include a cell region 105C where memory cells are formed and a peripheral region 105P for wiring and reading data for the memory cells. Since a height of the cell region 105C is different from a height of the peripheral region 105P, a focus error signal indicating a deviation amount from a focus position in the cell region 105C is different from a focus error signal in the peripheral region 105P.

Figure 10:
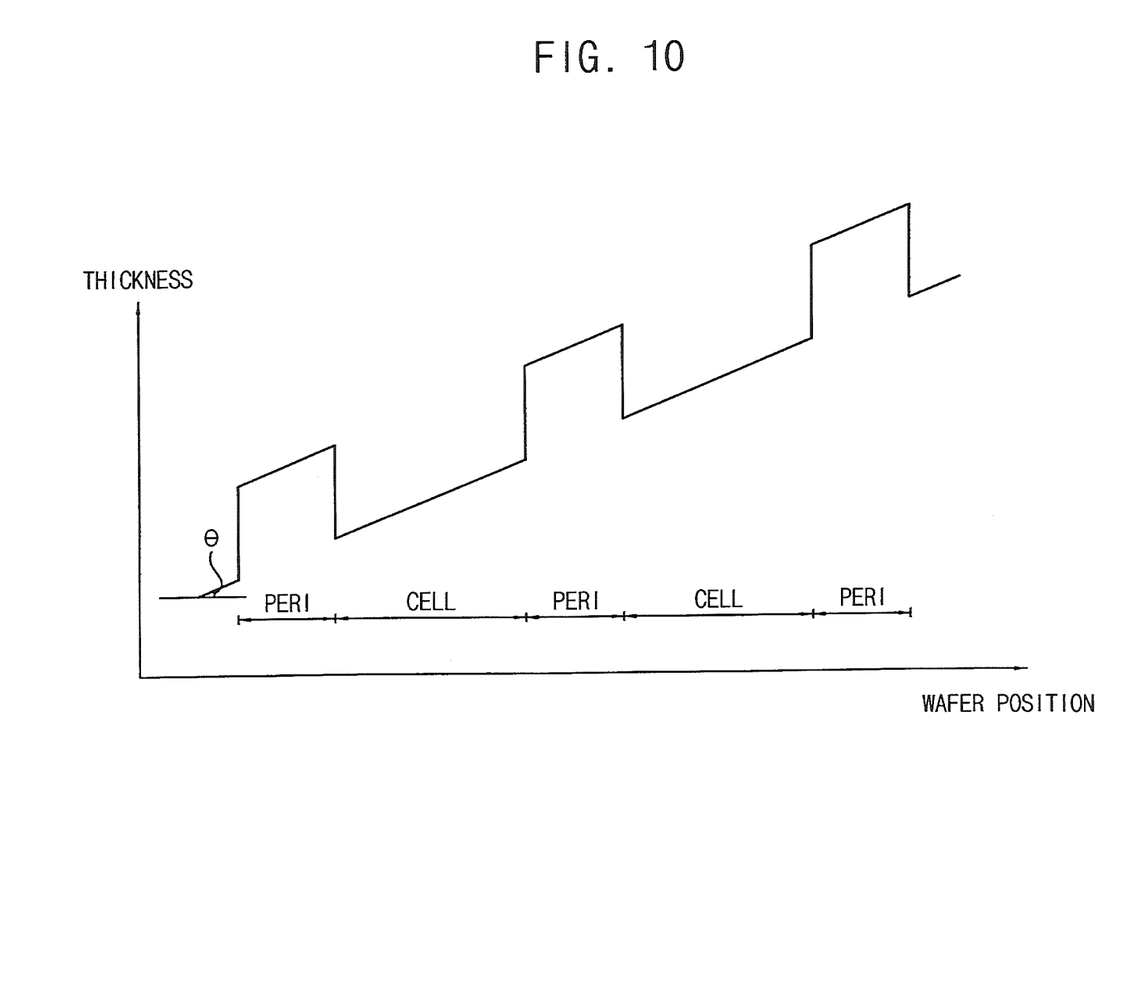
FIG. 10 is a view illustrating a real cross section of the semiconductor wafer 105 taken along the line B-B' in FIG. 9(b).

FIG. 10 is a view illustrating a real cross section of the semiconductor wafer 105 taken along the line B-B' in FIG. 9(b). In FIG. 10, a horizontal axis represents a position of the semiconductor wafer 105 and a vertical axis represents a thickness of the semiconductor wafer 105.

As illustrated in FIG. 10, in reality, the semiconductor wafer 105 has different thicknesses and a curved surface shape. Accordingly, the focus error signal includes a component of a height variance due to an angle (θ) of the surface curvature.

Figure 11:
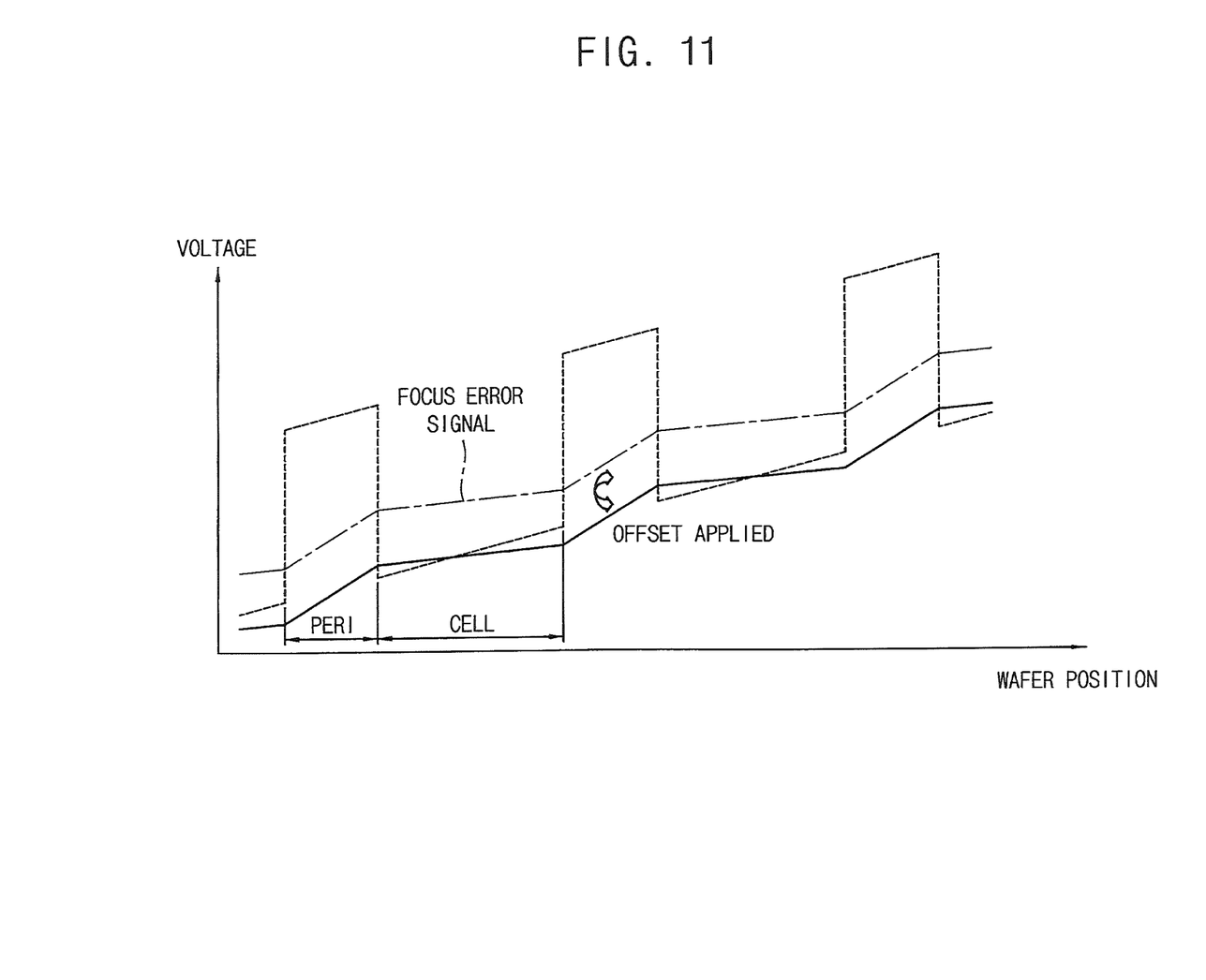
FIG. 11 is a waveform graph illustrating a focus error signal along the cross section of the semiconductor wafer 105 in FIG. 10.

FIG. 11 is a waveform graph illustrating a focus error signal along the cross section of the semiconductor wafer 105 in FIG. 10. In FIG. 11, a horizontal axis represents a position of the semiconductor wafer 105 and a vertical axis represents a voltage level. In here, the focus error detected due to the surface variance of the semiconductor wafer 105 is represented by the dotted line. A wave obtained by performing a low pass filtering of the focus error represented by the dotted line is represented by the dashed dotted line, and a focus error signal generated by applying an offset to the wave obtained by a low pass filtering is represented by the solid line. The focus position control portion 106 moves the XYZ stage 104 in Z direction using the stage control mechanism 107 based on the focus error signal of the solid line, to control a focus position of the semiconductor wafer 105.

Figure 12:
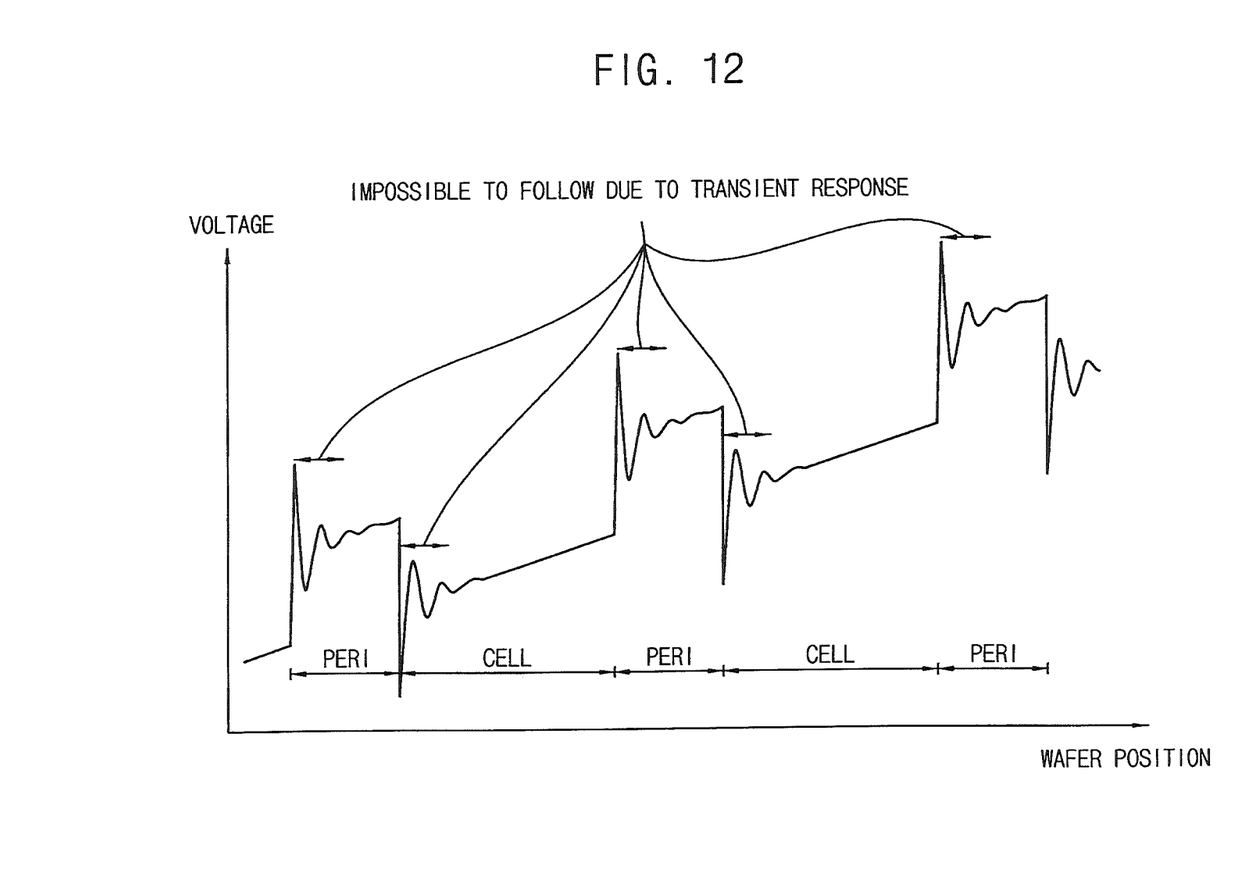
FIG. 12 is a waveform graph illustrating a focus error signal along the cross section of the semiconductor wafer 105 in FIG. 10.

FIG. 12 is a waveform graph illustrating a focus error signal along the cross section of the semiconductor wafer 105 in FIG. 10. In FIG. 12, a horizontal axis represents a position of the semiconductor wafer 105 and a vertical axis represents a voltage level. In FIG. 12, the position control of the XYZ stage 104 is performed using the detected focus error signal without a special process such as the low pass filtering in FIG. 11. Even though any focus error signal of FIGS. 11 and 12 is used, a high precision focus control is performed to optically inspect a defect on the surface of the semiconductor wafer (W). In other words, when the XYZ stage 104 moves in two dimension XY plane, it is required to move the XYZ stage 104 in Z direction in order to correct a focal point deviation that occurs due to the thickness variance.

CONVENTIONAL ART DOCUMENT

Patent Document

Patent document 1: Japanese Laid-open Patent Publication No. 2002-90311

SUMMARY

However, in case the focus error signal of FIG. 11 is used, the focus error signal near the interface between the peripheral region 105P and the cell region 105C has a great error from the real focus error, due to smoothing of the low pass filter. As a result, the focus error signal near the interface having the error is used for the focus position control, thereby deteriorating the degree of precision of the focus position control in proximity to the interface. In FIG. 11, in order to perform a surface inspection of the cell region 105C, the surface of the cell region 105C is controlled to be focused.

That is, in FIG. 11, in order to detect only a surface inclination due to the thickness variation of the semiconductor wafer 105, the detection of the focus error is performed by the low pass filter. Then, the detected focus error is controlled by applying an offset, to follow the cell region 105C of the object.

In here, because only the surface inclination of the semiconductor wafer 105 is considered, the degree of precision of the focus position control in proximity to the interface between the peripheral region 105P (Peri) and the cell region 105C (Cell) is deteriorated, as mentioned above. Accordingly, the degree of the focus position control in proximity to the interface is deteriorated and thus the degree of precision of a surface inspection in proximity to the interface is decreased.

Further, in FIG. 12, response characteristics of the focus error signal can be improved within an allowable range of the stage control mechanism 107 for moving the XYZ stage 104 having the semiconductor wafer 105 mounted thereon.

However, when one of the peripheral region 105P and the cell region 105C is changed to the other, a transient response occurs due to a rapid change of the signal intensity near the step portion therebetween. Accordingly, for a while after the region is changed, the focus error signal cannot follow the real focus position error to thereby deteriorate the degree of the focus position control in proximity to the interface. Thus, the degree of precision of a surface inspection in proximity to the interface is decreased.

Example embodiments provide a focus control apparatus and method capable of generating a focus position signal according to a real focus position error even in proximity to the interface between regions having different thicknesses to perform a high precision focus position control using the focus position signal.

According to example embodiments, a focus control apparatus includes an error signal correction portion configured to correct a focus error signal which indicates an error from a focus position of an object with respect to an optical system and a region conversion detection portion configured to output a regional signal which corresponds to an observation region or a non-observation region, when the observing region of the optical system is converted between the observation region and the non-observation region having a height different from a height of the observation region, wherein the error signal correction portion corrects the focus error signal to a value corresponding to an error from the focus position in the observation region when the region signal indicates the non-observation region.

In the focus control apparatus, the error signal correction portion includes a switch and a condenser, an end of the switch is connected to a terminal to which the focus error signal is inputted, another end of the switch is connected to an end of the condenser, another end of the condenser is connected to a ground, the switch is on state when the region signal indicates the observation region, and the switch is off state when the region signal indicates the non-observation region, to perform the correction of the focus error signal.

In the focus control apparatus, the error signal correction portion includes an adder, a constant voltage and a two-inputs-one-output switch, the constant voltage portion outputs an offset voltage of a predetermined voltage, the adder adds the offset voltage to the focus error signal to generate a corrected focus error signal, the focus error signal is supplied to one input of the switch, and the corrected focus error signal is supplied to the other input of the switch, the one input of the switch is connected to the output of the switch when the region signal indicates the observation region, and the other input of the switch is connected to the output of the switch when the region signal indicates the non-observation region, to perform the correction of the focus error signal.

In the focus control apparatus, the region conversion detection portion includes a wafer map memory portion configured to store position coordinates of the observation region and the non-observation region, and a map combination portion configured to output the region signal, which indicates whether the current observing region of the optical system is the observation region or the non-observation region, with reference to the wafer map memory portion, to the error signal correction portion.

According to example embodiments, a focus control method includes an error signal correction step where an error signal correction portion corrects a focus error signal which indicates an error from a focus position of an object with respect to an optical system and a region conversion detection step where a region conversion detection portion outputs a regional signal which correspond to an observation region or a non-observation region, when the observing region of the optical system is converted between the observation region and the non-observation region having a height different from a height of the observation region, wherein the error signal correction portion corrects the focus error signal to a value corresponding to an error from the focus position in the observation region when the region signal indicates the non-observation region.

According to example embodiments, in order to correct a focus error signal in the non-observation region to correspond to a height of the observation region, a focus position signal due to an error of a real focus position even in the interface between regions having different heights is generated, and used to perform a high precision focus position control of an object with respect to an optical system.

BRIEF DESCRIPTION OF THE DRAWINGS

Example embodiments will be more clearly understood from the following detailed description taken in conjunction with the accompanying drawings. FIGS. 1 to 12 represent non-limiting, example embodiments as described herein.

DETAILED DESCRIPTION OF EXAMPLE EMBODIMENTS

First Example Embodiment

Figure 1:
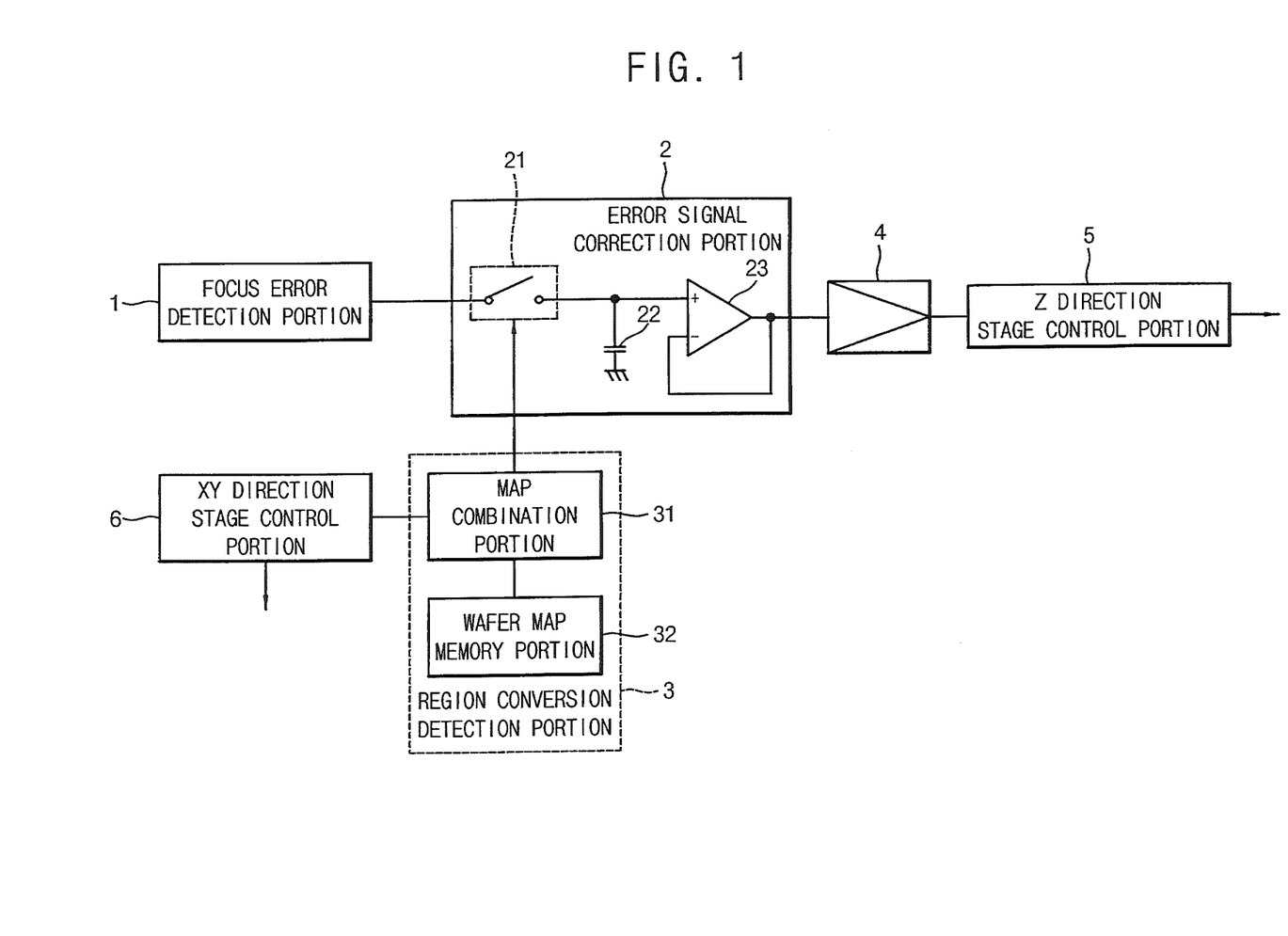
FIG. 1 is a block diagram illustrating a focus control apparatus in accordance with a first example embodiment.

Hereinafter, a first example embodiment will be explained in detail with reference to the accompanying drawings. FIG. 1 is a block diagram illustrating a construction of a focus control apparatus in accordance with a first example embodiment. Hereinafter, a construction of the focus control apparatus according to a first example embodiment which is substituted for the focus position control portion 106 of a semiconductor inspecting apparatus including a microscope, which performs a surface inspection of the semiconductor wafer 105, will be explained.

The focus control apparatus according to this example embodiment includes a focus error detection portion 1, an error signal correction portion 2, a region conversion detection portion 3, a driver 4, a Z direction stage control portion 5, and an XY direction stage control portion 6.

The focus error detection portion 1 changes a deviation amount of a focus position with respect to a surface of the semiconductor wafer 105 of the microscopic optical system 102 in FIG. 8 into a voltage level, to output a focus error signal.

The error signal correction portion 2 corrects the focus error signal outputted from the focus error detection portion 1 to a value corresponding to a focus position error in an observation region when a region signal (described later) indicates a non-observation region.

The region conversion detection portion 3 outputs the region signal which indicates whether the current observing region is a non-observation region or an observation region. In this example embodiment, the cell region 105C of the surface of the semiconductor wafer 105 is referred to as the non-observation region, and the peripheral region 105P of the surface of the semiconductor wafer 105 is referred to as the observation region. The XY direction stage control portion 6 moves the XY stage 104 in X direction or Y direction, at a predetermined velocity that satisfies a time required to detect a defect on the surface of the semiconductor wafer 105.

The drive 4 performs a power amplification of the focus error signal provided to actuate the stage control mechanism 107 moving the XYZ stage 104. The Z direction stage control portion 5 actuates the stage control mechanism 107 with a focus error signal corresponding to the deviation amount of the focus position, by the power amplified focus error signal, to move the XYZ stage 104 in Z axis direction.

The XY direction stage control portion 6 actuates the stage control mechanism 107 at a predetermined velocity, to move the XYZ stage 104 in two dimensional plane of X-axis and Y axis.

Then, a correction process of the focus error signal by the error signal correction portion 2 will be explained. The error signal correction portion 2 includes a switch 21, a condenser 22 and an operational amplifier 23. The region conversion detection portion 3 includes a map combination portion 31 and a wafer map memory portion 32.

A wafer map, which represents chip position coordinates of each chip 105T on the surface (two dimensional coordinate) of the semiconductor wafer 105, and region position coordinates of the cell region 105C and the peripheral region 105P of each chip 105T, is recorded in the wafer map memory portion 32.

The XY direction stage control portion 6 outputs a travel distance of the XYZ stage 104 that moves in X direction or Y direction as a travel velocity and a travel time, to the map combination portion 31. In here, an alignment mark 105M is provided on the semiconductor wafer 105 (see FIG. 9(a)). The XY direction stage control portion 6 outputs the travel distance of the XYZ stage 104 in X direction or Y direction to the map combination portion 31, with an initial position previously initialized by the alignment mark 105M.

The chip position coordinates and the region position coordinates are determined corresponding to the initial position. By the above-mentioned construction, the map combination portion 31 compares the integrated value of the travel distance from the XY direction stage control portion 6 to the chip position coordinate and the region position coordinate of the wafer map, to detect the position of the observing region of the optical system 102. The map combination portion 31 outputs the region signal, which indicates whether the current observing region of the optical system 102, that is, the region which the image capturing device 103 is picking up, is the cell region 105C as the observation region or the peripheral region 105P as the non-observation region of the chip 105T of the semiconductor wafer 105, to the error signal correction portion 2. In here, when both the observation region and the non-observation region are included in the imaging capturing range of the image capturing device 103, the map combination portion 31 outputs a region signal indicating the observation region, to properly control the focus position on the object.

In the error signal correction portion 2, when the region signal supplied from the map combination portion 31 indicates the observation region (for example, the signal level of the region signal is 'H'), the switch 21 is on state (connection state) to accumulate the voltage level of the focus error signal supplied from the focus error detection portion 1 in the condenser 22.

On the other hand, when the region signal supplied from the map combination portion 31 indicates the non-observation region (for example, the signal level of the region signal is the switch 21 is off state (disconnection state) to maintain the voltage level of the focus error signal of the observation region in the condenser 22.

Additionally, as necessary, the inspecting region which the image capturing device picks up (the region where a surface inspection is performed) is minutely adjusted, that is, the inspecting region can be reduced, to avoid a minimally remaining transient response.

Figure 2:
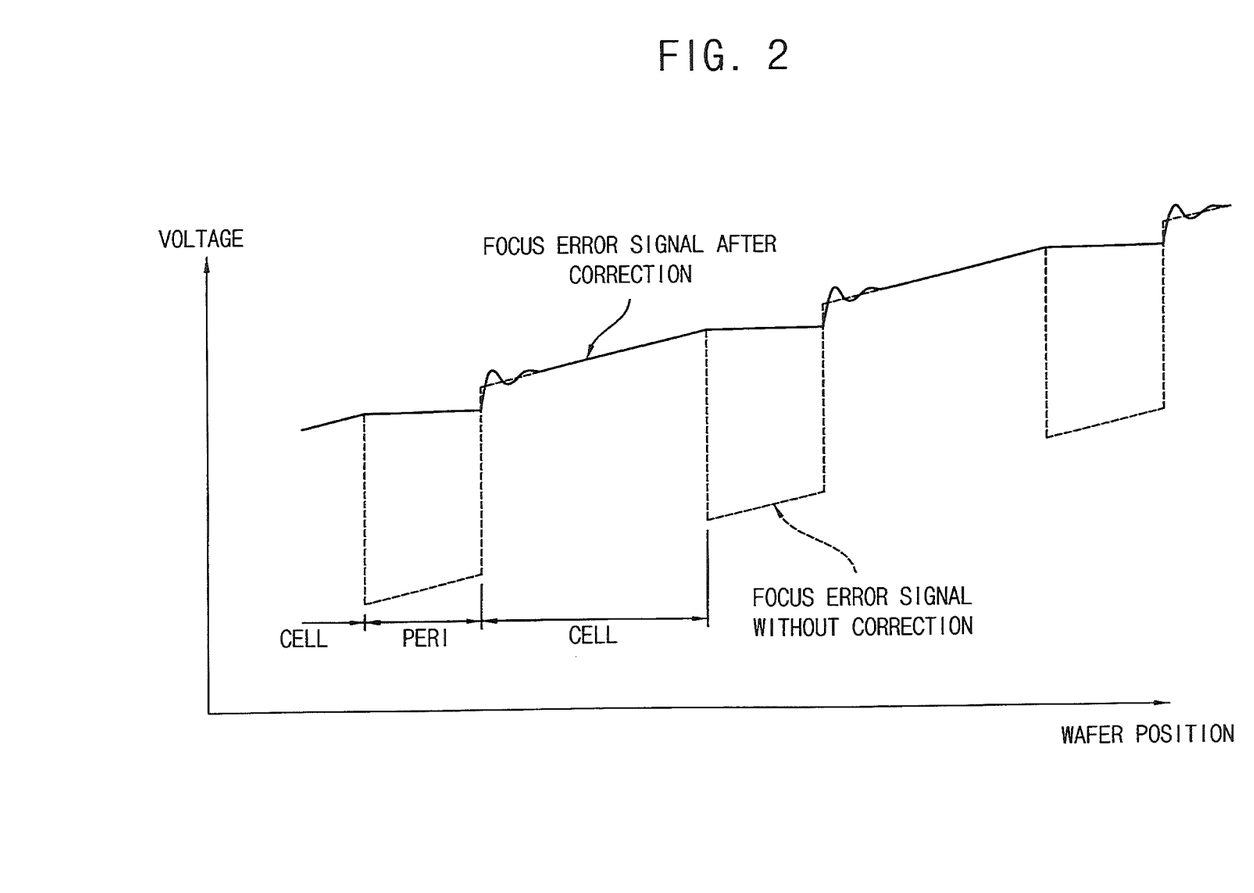
FIG. 2 is a graph illustrating a correction process of a focus error signal by an error signal correction portion 2 in accordance with a first example embodiment.

FIG. 2 is a graph illustrating a correction process of the focus error signal by the error signal correction portion 2 in accordance with a first example embodiment. In FIG. 2, a horizontal axis represents a wafer position, and a vertical axis represents a voltage level of a focus error signal. The dotted line represents an original focus error signal supplied from the focus error detection portion 1. The solid line represents a focus error signal that is outputted to the driver 4 after correcting the original focus error signal supplied from the focus error detection portion 1 by the error signal correction portion 2.

The error signal correction portion 2 supplies a voltage level of the original focus error signal supplied from the focus error detection portion 1 to the driver 4 and accumulates the voltage level in the condenser 22, when the region signal indicating the cell region 105C as the observation region is supplied from the region conversion detection portion 3.

On the other hand, the error signal correction portion 2 supplies the voltage level of the focus error signal in the cell region 105C supplied from the focus error detection portion 1, which is accumulated in the condenser 22, when the region signal indicating the peripheral region 105P as the non-observation region is supplied from the region conversion detection portion 3.

Thus, in the focus error signal outputted to the Z direction stage control portion 5, a transient response in the conversion interface from the cell region 105C to the peripheral region 105P can be removed. Additionally, a transient response in the interface of the conversion from the peripheral region 105P to the cell region 105C corresponds to an error by the curvature of the thickness of the semiconductor wafer 105 because the voltage level of the focus error signal in the cell region 105C at a different wafer position is supplied from the focus error detection portion 1 since the thickness at the wafer position where the voltage level is accumulated in the condenser 22 (e.g., a capacitor, as illustrated in FIG. 1) is maintained.

Accordingly, according to this example embodiment, a voltage variation in the transient response can be reduced compared to a conventional variation, and a higher precision position control of the surface of the semiconductor wafer 105 with respect to the optical system 102 can be performed. Because a higher precision position control of the optical system 102 on the surface of the semiconductor wafer 105 is possible, a clear image in the interface region can be picked up by the image capturing device 103, and degree of precision of defect detection in a surface inspection of the semiconductor wafer 105 can be improved.

Second Example Embodiment

Figure 3:
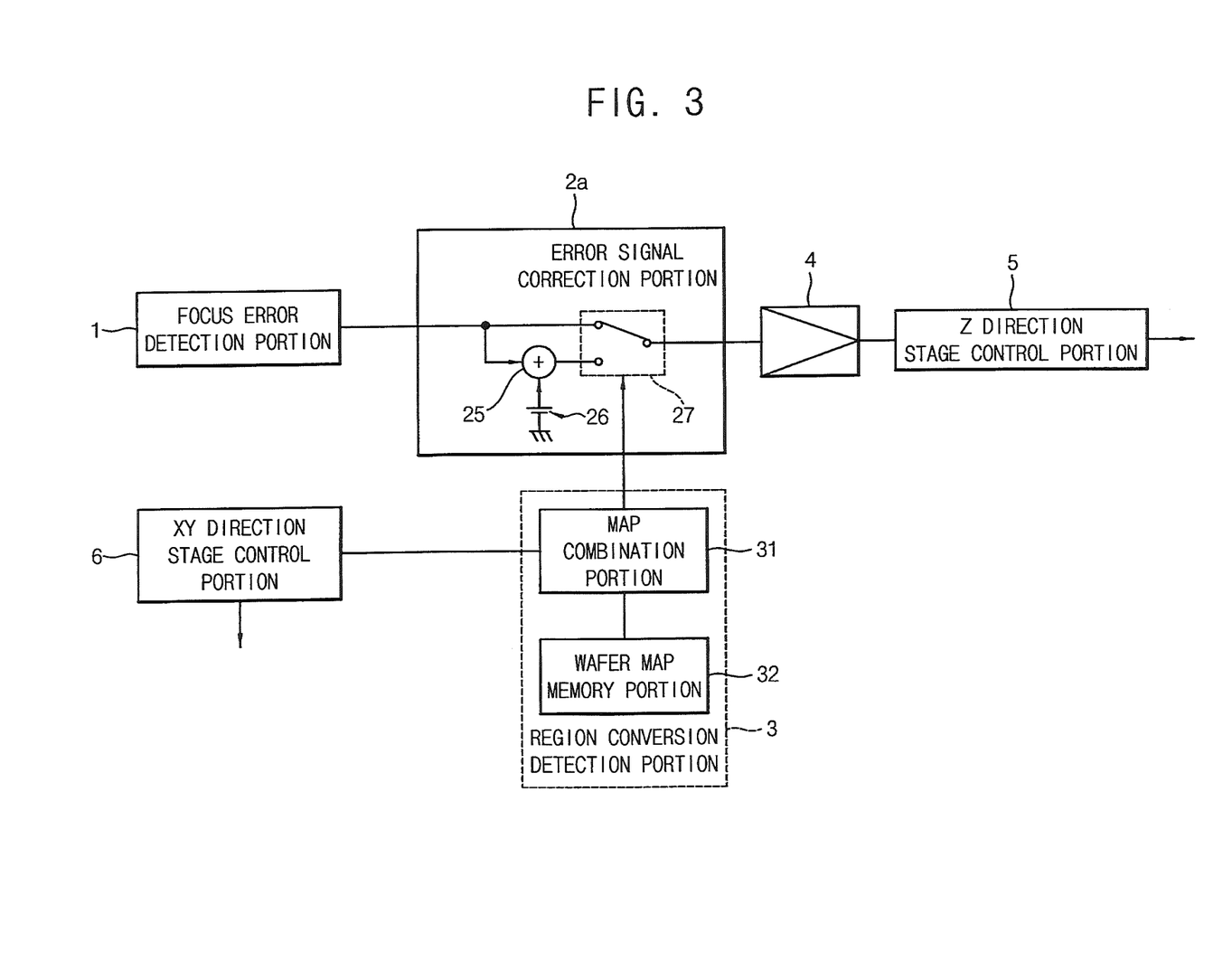
FIG. 3 is a block diagram illustrating a focus control apparatus in accordance with a second example embodiment.

Hereinafter, a second example embodiment will be explained with reference to the accompanying drawings. FIG. 3 is a block diagram illustrating a focus control apparatus in accordance with a second example embodiment. Hereinafter, a construction of the focus control apparatus according to a second example embodiment which is substituted for the focus position control portion 106 of a semiconductor inspecting apparatus performing a surface inspection of the semiconductor wafer 105 will be explained.

The focus control apparatus according to this example embodiment includes a focus error detection portion 1, an error signal correction portion 2A, a region conversion detection portion 3, a driver 4, a Z direction stage control portion 5, and an XY direction stage control portion 6. The focus control apparatus according to this example embodiment is substantially the same as in the first example embodiment except the error signal correction portion 2A. Thus, a construction and an operation of the error signal correction portion 2A will be mainly explained.

The error signal correction portion 2A includes an adder 25, a constant voltage portion 26 and a switch 27. The constant voltage portion 26 outputs an offset voltage of a predetermined voltage value. The adder 25 adds the offset voltage outputted from the constant voltage portion 26 to a voltage level of a focus error signal supplied from the focus error detection portion 1, and outputs an adding result as a focus error signal after correction. The offset voltage is set to a voltage corresponding to a pre-detected height difference between an observation region and a non-observation region.

The switch 27 is two-inputs-one-output switch, and outputs any one of two inputs, according to a supplied region signal as a selection signal. One input receives a focus error signal from the focus error detection portion 1 and the other input receives the focus error signal after correction outputted from the adder 25. That is, the switch 27 outputs the focus error signal supplied from the focus error detection portion 1 to the driver 4, or outputs the focus error signal after correction supplied from the adder 25 to the driver 4.

In this embodiment, when a region signal supplied from the map combination portion 31 indicates an observation region (for example, a signal level of the region signal is 'H'), one input of the switch 27 is connected to the driver 4 (connection state) to output the focus error signal supplied from the focus error detection portion to the driver 4.

On the other hand, when the region signal supplied from the map combination portion 31 indicates a non-observation region (for example, the signal level of the region signal is 'L'), the other input of the switch 21 is connected to the driver 4 (connection state) to output the corrected focus error signal (offset voltage added) supplied from the adder 26 to the driver 4.

Figure 4:
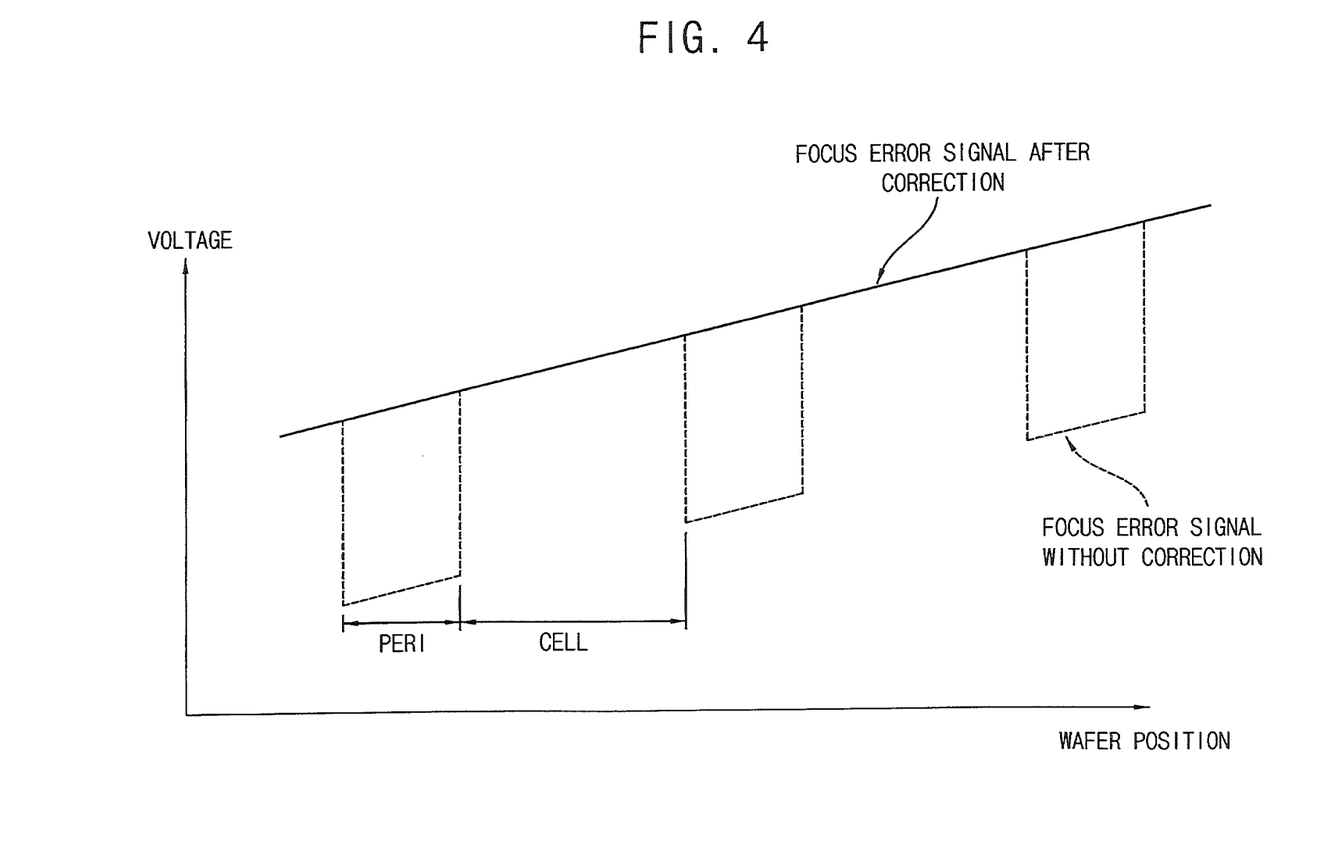
FIG. 4 is a graph illustrating a correction process of a focus error signal by an error signal correction portion 2A in accordance with a second example embodiment.

FIG. 4 is a graph illustrating a correction process of a focus error signal by an error signal correction portion 2A in accordance with a second example embodiment. In FIG. 4, a horizontal axis represents a wafer position, and a vertical axis represents a voltage level of a focus error signal. The dotted line represents an original focus error signal supplied from the focus error detection portion 1. The solid line represents a focus error signal that is outputted to the driver 4 after correcting the original focus error signal supplied from the focus error detection portion 1 by the error signal correction portion 2A.

The error signal correction portion 2A supplies a voltage level of the original focus error signal supplied from the focus error detection portion 1 to the driver 4, when the region signal indicating the cell region 105C as the observation region is supplied from the region conversion detection portion 3.

On the other hand, the error signal correction portion 2A supplies the voltage level of the corrected focus error signal with the offset voltage added to the driver 4, when the region signal indicating the peripheral region 105P as the non-observation region is supplied from the region conversion detection portion 3.

Thus, in the focus error signal outputted to the Z direction stage control portion 5, a transient response in the conversion interface from the cell region 105C to the peripheral region 105P and a transient response in the conversion interface from the peripheral region 105P to the cell region 105C can be removed.

Accordingly, according to this example embodiment, a voltage variation in the transient response can be reduced, to thereby perform a higher precision position control. Thus, degree of precision of defect detection in a surface inspection of the semiconductor wafer 105 can be improved.

Focus Error Detection Method 1

Figure 5:
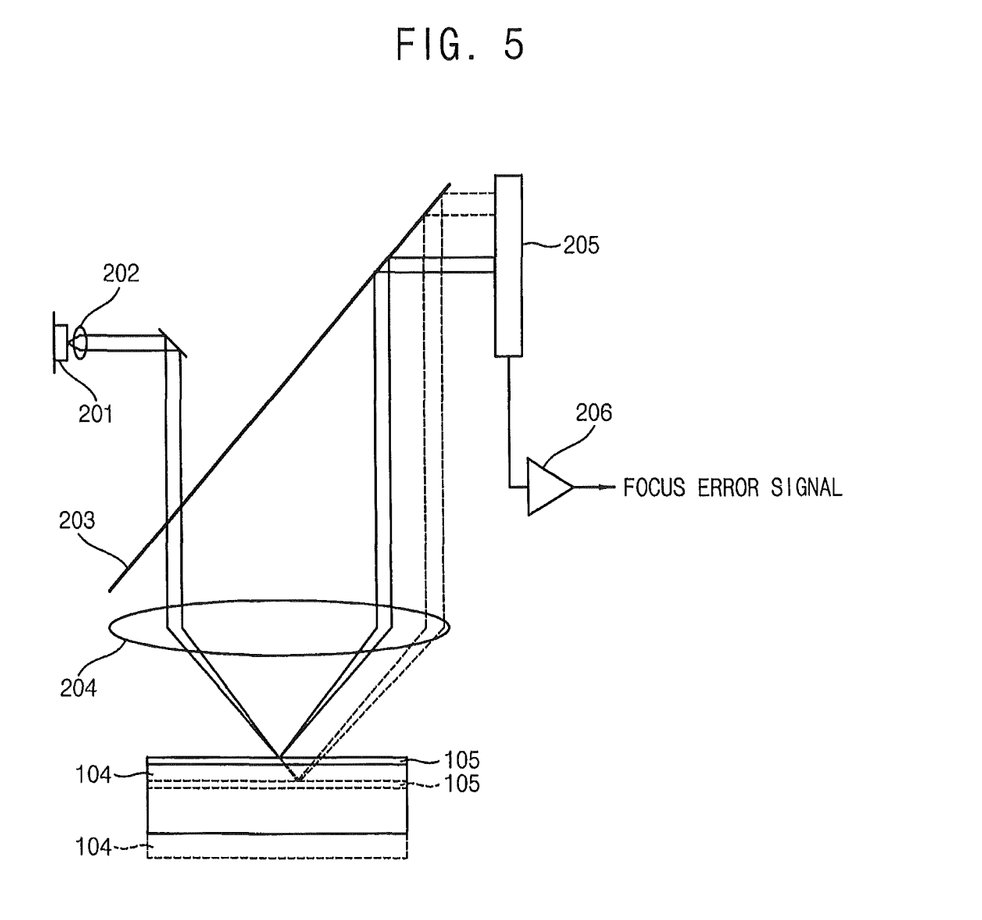
FIG. 5 is a view illustrating focus error detection by a focus error detection portion 1 using a positive sensitive detector PSD.

Next, a focus error detection method of obtaining a focus error signal in accordance with this example embodiment will be explained. FIG. 5 is a view illustrating focus error detection by the focus error detection portion 1 using a positive sensitive detector PSD. In FIG. 5, the XYZ stage 104 and the semiconductor wafer 105 shown by the dotted line deviates from the focus position in Z direction. Additionally, the XYZ stage 104 and the semiconductor wafer 105 shown by the solid line are focused in Z direction.

A semiconductor laser 201 emits a detecting light for detecting a focus error.

A collimator lens 202 converts the detecting light from the semiconductor laser 210 into a parallel light.

A mirror 203 transmits the parallel detecting light to emit toward an objective lens 204.

An objective lens 204 irradiates the detecting light into a surface of the semiconductor wafer 105, and a reflection light reflected from the surface of the semiconductor wafer 105 emits toward the mirror 203.

The mirror 203 emits the reflection light from the surface of the semiconductor wafer 105 toward the PSD 205.

The PSD 205 outputs a detection signal corresponding to a position of the PDS 205 where the reflection light is incident. In other words, the PSD 205 has a rod shaped detecting portion, the middle point of which is set to a focused position. By a deviation direction in which the incident position deviates from the middle point of the detecting portion, whether it deviates + direction or − direction from the focused position in Z direction is detected to determine an absolute value of a deviation amount from the focused position in Z direction. Accordingly, the PSD 205 represents the deviation direction of + direction and − direction in Z direction with a polarity of a voltage and outputs a detection signal by represented by a voltage value to a buffer 206. The buffer 206 amplifies the detection signal to supply a focus error signal to the error signal correction portion 2.

Accordingly, according to this example embodiment, a voltage variation in the transient response can be reduced, and a higher precision position control of the surface of the semiconductor wafer 105 with respect to the optical system 102 can be performed. Thus, because a high precision control of the focus position on the surface of the semiconductor wafer 105 can be performed, a clear image in the interface region can be picked up by the image capturing device 103, and degree of precision of defect detection in a surface inspection of the semiconductor wafer 105 can be improved.

Focus Error Detection Method 2

Figure 6:
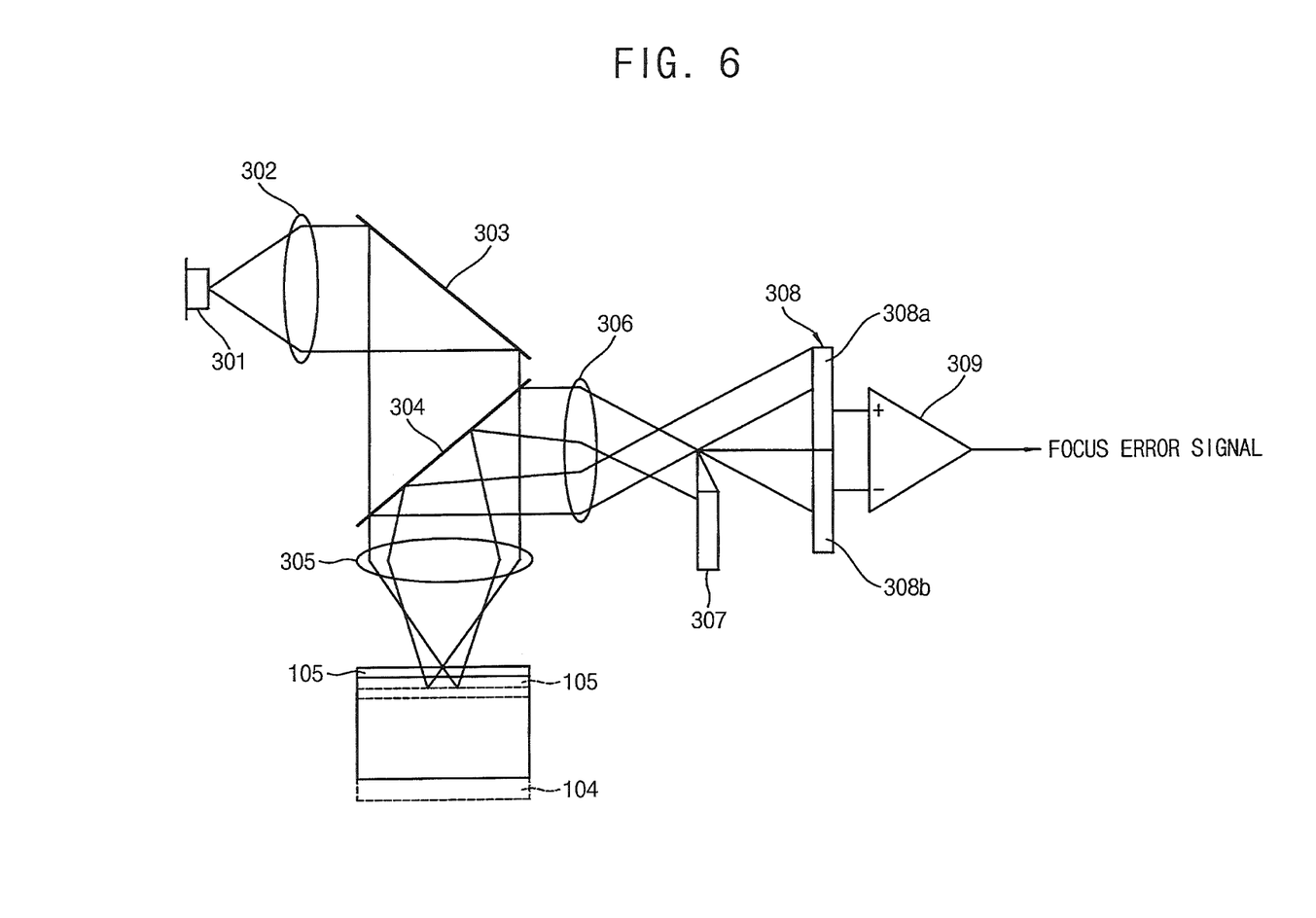
FIG. 6 is a view illustrating focus error detection by a focus error detection portion 1 using a knife edge.

Next, another focus error detection method of obtaining a focus error signal in accordance with this example embodiment will be explained. FIG. 6 is a view illustrating focus error detection by a focus error detection portion 1 using a knife edge. In FIG. 6, the XYZ stage 104 and the semiconductor wafer 105 shown by the dotted line deviates from the focus position in Z direction. Additionally, the XYZ stage 104 and the semiconductor wafer 105 shown by the solid line are focused in Z direction.

A semiconductor laser 301 emits a detecting light for detecting a focus error.

A collimator lens 302 converts the detecting light from the semiconductor laser 310 into a parallel light.

A mirror 303 reflects the parallel detecting light to emit toward a mirror 304.

The mirror 304 transmits the detecting light from the mirror 303 to emit toward an objective lens 204.

An objective lens 304 concentrates the detecting light onto a surface of the semiconductor wafer 105, and a reflection light reflected from the surface of the semiconductor wafer 105 emits toward the mirror 304.

The mirror 304 emits the reflection light from the surface of the semiconductor wafer 105 toward a condensing lens 306.

The knife edge 307 is arranged between the condensing lens 306 and a photo detector 308, and blocks a portion of the light incident on the photo detector 308. The knife edge 307 is arranged such that the reflection light from the condensing lens 306 is focused, when the XYZ stage 104 is at a focused position in Z direction. That is, the condensing lens 306 concentrates the reflection light from the surface of the semiconductor wafer 105 to a space near a front end of the knife edge 307.

The light detector 308 includes a light detecting portion having two divided light detecting portions 308A and 308B, and outputs a detection signal by a difference between light amounts which the light detecting portions 308A and 308B receive the reflection light from the surface of the semiconductor wafer 105.

Figure 7:
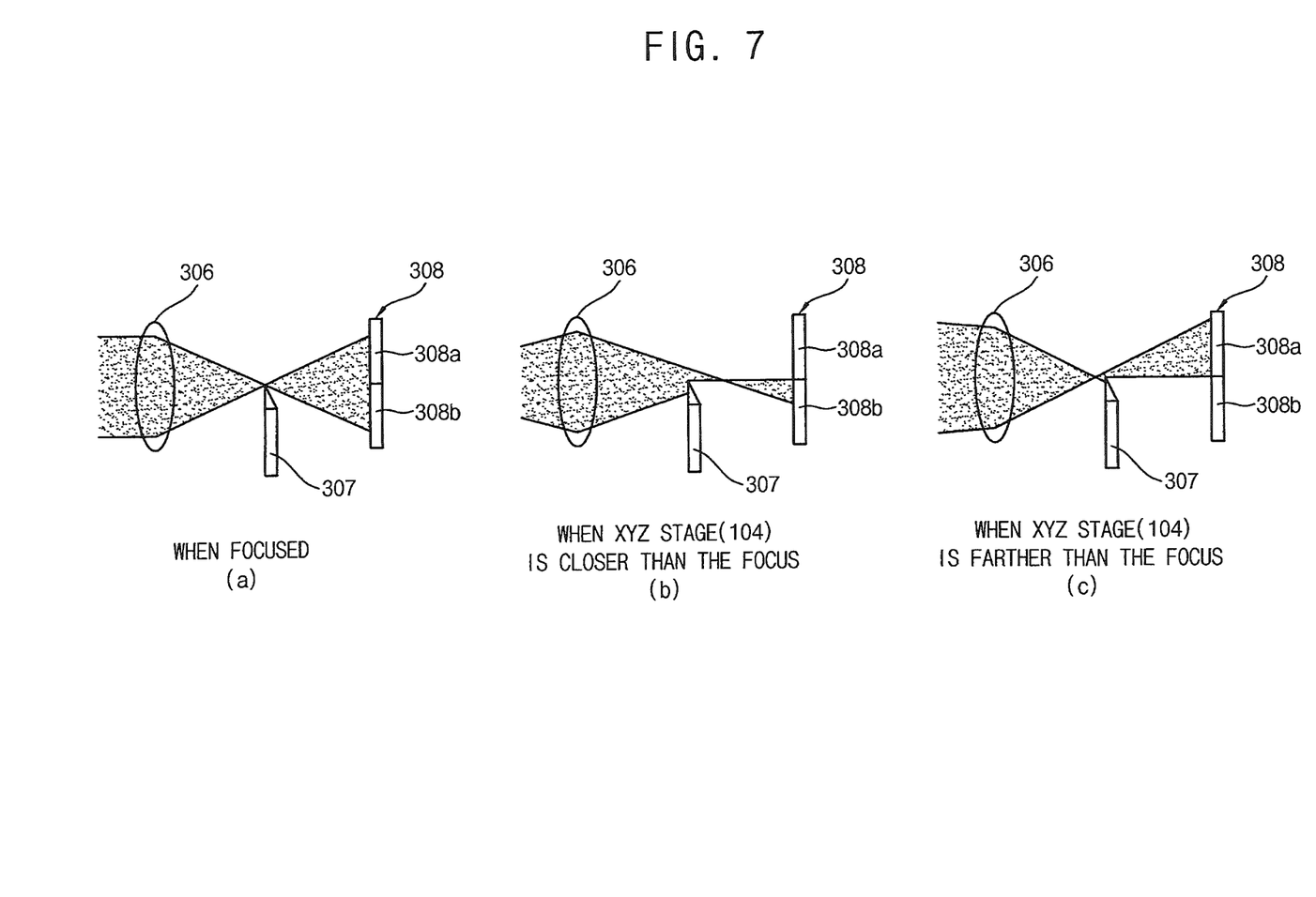
FIGS. 7(a) to 7(c) are views illustrating processes of generating a focus error detection signal corresponding to a deviation amount from a focus position, by a light detector 308.

FIGS. 7(a) to 7(c) are views illustrating processes of generating a focus error detection signal corresponding to a deviation amount from a focus position, by the light detector 308.

FIG. 7(a) represents a state of a reflection light incident on the light detector 308 from the condensing lens 306 when the XYZ stage 104 is at a focused position in Z axis. In this case that the XYZ stage 104 is at the focused position in Z axis, because the reflection light is concentrated over the front end of the knife edge 307, all the reflection light is incident on the light detector 308 without being blocked. Thus, the light receiving light of the light detecting portion 308a is the same as that of the light detecting portion 308B. As a result, a differential amp 309 output a focus error signal of '0V', because the same voltage is applied to a non-inverting input terminal and an inverting input terminal.

FIG. 7(b) represents a state of a reflection light incident on the light detector 308 from the condensing lens 306 when the XYZ stage 104 deviates from a focused position in Z axis. In this case, the XYZ stage 104 is positioned nearer to the objective lens 305 with respect to the focus position of the objective lens 305. Thus, the focus is formed at a position nearer to the light detector 308 with respect to the knife edge 307 so that a portion of the reflection light is blocked and thus the light receiving amount of the light detecting portion 308B becomes greater than that of the light detecting portion 308A. As a result, the differential amp 309 output a focus error signal corresponding to the light amount difference of (−) polarity, because a voltage supplied to the inverting input terminal is greater than a voltage supplied to the non-inverting input terminal.

FIG. 7(c) represents a state of a reflection light incident on the light detector 308 from the condensing lens 306 when the XYZ stage 104 deviates from a focused position in Z axis. In this case, the XYZ stage 104 is positioned farther from the objective lens 305 with respect to the focus position of the objective lens 305. Thus, the focus is formed at a position farther from the light detector 308 with respect to the knife edge 307 so that a portion of the reflection light is blocked and thus the light receiving amount of the light detecting portion 308A becomes greater than that of the light detecting portion 308B. As a result, the differential amp 309 output a focus error signal corresponding to the light amount difference of (+) polarity, because a voltage supplied to the non-inverting input terminal is greater than a voltage supplied to the inverting input terminal.

Further, programs for executing each function of the error signal correction portion 2 and the region conversion detection portion 3 in FIG. 1 and each function of the error signal correction portion 2A and the region conversion detection portion 3 in FIG. 3 may be stored in computer readable recording medium and read by a computer system to perform the focus position control of the microscopic optical system. In here, the 'computer system' may be understood to include a hard ware such as OS or surrounding equipment.

Furthermore, when the 'computer system' uses WWW system, the 'computer system' may be understood to include a homepage supply environment (or display environment)

Furthermore, the 'computer readable recording medium' may include flexible disk, optical magnetic disk, ROM, CD-ROM, hard disk embedded in the computer system. Furthermore, the 'computer readable recording medium' may include dynamically storing a program in a short time, for example, when the program is transmitted through electric telecommunication lines such as network such as internet or telephone lines and storing a program for a specific time such as non-volatile memory for server or client in the above case.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention.

What is claimed is:

1. A focus control apparatus, comprising:
   an error signal correction portion configured to process a focus error signal that indicates an error of a focus position of a microscope optical system with respect to an object, wherein the microscope optical system is configured to receive light from a light source, wherein a stage control mechanism is configured to adjust a position of a stage having the object thereon, and wherein an image-capturing device is configured to receive light reflected from the object; and
   a region conversion detection portion configured to output a region signal that indicates:
      a peripheral region of the object, when the peripheral region of the object is included in an image-capturing range of the image-capturing device; or
      a cell region of the object, when the cell region is included in the image-capturing range of the image-capturing device,
   wherein the peripheral and cell regions of the object comprise different respective heights.

2. The focus control apparatus of claim 1, wherein:
   the error signal correction portion comprises a switch and a capacitor;
   an end of the switch is connected to a terminal to which the focus error signal is input;
   another end of the switch is connected to an end of the capacitor;
   another end of the capacitor is connected to a ground;
   the switch is in an on state when the region signal indicates the peripheral region; and
   the switch is in an off state when the region signal indicates the cell region.

3. The focus control apparatus of claim 1, wherein:
   the error signal correction portion comprises an adder, a constant voltage portion, and a switch comprising an output and first and second inputs;
   the constant voltage portion is configured to output an offset voltage of a predetermined voltage;
   the adder is configured to add the offset voltage to the focus error signal to generate a corrected focus error signal;
   the focus error signal is supplied to the first input of the switch;
   the corrected focus error signal is supplied to the second input of the switch;
   the first input of the switch is connected to the output of the switch when the region signal indicates the cell region; and
   the second input of the switch is connected to the output of the switch when the region signal indicates the peripheral region.

4. The focus control apparatus of claim 1, wherein the region conversion detection portion comprises:
   a wafer map memory portion configured to store position coordinates of the peripheral and cell regions of the object; and
   a map combination portion configured to output the region signal to the error signal correction portion.

5. The focus control apparatus of claim 1, wherein the error signal correction portion is configured to process the focus error signal in response to receiving the region signal from the region conversion detection portion.

6. The focus control apparatus of claim 1,
   wherein the error signal correction portion is configured to output a first voltage in response to the region signal indicating the peripheral region of the object, and
   wherein the error signal correction portion is configured to output a second voltage that is different from the first voltage in response to the region signal indicating the cell region of the object.

7. The focus control apparatus of claim 1, wherein the object comprises a semiconductor wafer comprising the peripheral and cell regions.

8. A focus control method, the method comprising:
   processing, using an error signal correction portion of a focus control apparatus, a focus error signal that indicates an error of a focus position of a microscope optical system with respect to an object, wherein an image-capturing device is configured to receive light reflected from the object; and
   outputting, using a region conversion detection portion of the focus control apparatus, a region signal that indicates:
      a peripheral region of the object, when the peripheral region is included in an image-capturing range of the image-capturing device; or
      a cell region of the object, when the cell region is included in the image-capturing range of the image-capturing device, wherein the peripheral and cell regions of the object comprise different respective heights.

9. The method of claim 8, wherein processing comprises processing the focus error signal in response to receiving the region signal from the region conversion detection portion.

10. The method of claim 8, wherein processing comprises:
    outputting, from the error signal correction portion, a first voltage in response to the region signal indicating the peripheral region of the object; and
    outputting, from the error signal correction portion, a second voltage that is different from the first voltage in response to the region signal indicating the cell region of the object.

11. The method of claim 8, wherein:
    the error signal correction portion comprises a switch and a capacitor;
    an end of the switch is connected to a terminal to which the focus error signal is input;
    another end of the switch is connected to an end of the capacitor;
    another end of the capacitor is connected to a ground; and
    processing comprises:
       switching the switch in an on state when the region signal indicates the peripheral region; and
       switching the switch in an off state when the region signal indicates the cell region.

12. The method of claim 8, wherein:
    the error signal correction portion comprises an adder, a constant voltage portion, and a switch comprising an output and first and second inputs;
    the constant voltage portion is configured to output an offset voltage of a predetermined voltage;

the adder is configured to add the offset voltage to the focus error signal to generate a corrected focus error signal;

the focus error signal is supplied to the first input of the switch;

the corrected focus error signal is supplied to the second input of the switch; and processing comprises:

connecting the first input of the switch to the output of the switch when the region signal indicates the cell region; and     connecting the second input of the switch to the output of the switch when the region signal indicates peripheral the region.

13. The method of claim 8, wherein the region conversion detection portion comprises:

a wafer map memory portion configured to store position coordinates of the peripheral and cell regions of the object; and     a map combination portion, and wherein outputting comprises outputting the region signal from the map combination portion to the error signal correction portion.

14. A focus control apparatus comprising:

a first portion configured to output a region signal that indicates:

a first region of an object being inspected by a microscope optical system, when the first region of the object is included in an image-capturing range of an image-capturing device configured to receive light reflected from the object; or     a second region of the object, when the second region is included in the image-capturing range of the image-capturing device, wherein the first and second regions of the object comprise different respective heights, and wherein a stage control mechanism is configured to adjust a position of a stage having the object thereon; and second portion configured to process a focus error signal that indicates an error of a focus position of the microscope optical system with respect to the object, in response to the region signal, wherein:

the second portion comprises an adder, a constant voltage portion, and a switch comprising an output and first and second inputs;

the constant voltage portion is configured to output an offset voltage;

the adder is configured to add the offset voltage to the focus error signal to generate a corrected focus error signal;

the focus error signal is supplied to the first input of the switch;

the corrected focus error signal is supplied to the second input of the switch;

the first input of the switch is connected to the output of the switch when the region signal indicates the first region; and     the second input of the switch is connected to the output of the switch when the region signal indicates the second region.

\* \* \* \* \*